United States Patent [19]

Jackson

[11] Patent Number: 5,469,601
[45] Date of Patent: * Nov. 28, 1995

[54] GRIP COVER

[76] Inventor: Linda J. Jackson, 965 N. 58th St., Mesa, Ariz. 85205

[*] Notice: The portion of the term of this patent subsequent to Sep. 20, 2011, has been disclaimed.

[21] Appl. No.: 264,603

[22] Filed: Jun. 23, 1994

Related U.S. Application Data

[63] Continuation of Ser. No. 78,447, Jun. 16, 1993, Pat. No. 5,347,684, which is a continuation-in-part of Ser. No. 959,436, Oct. 13, 1992, abandoned.

[51] Int. Cl.$^6$ ................................................ A47J 45/10
[52] U.S. Cl. .......................................... 16/111R; 16/114 R
[58] Field of Search ............................. 16/111 R, 110 R, 16/114 R, 116 A, 116 R

[56] References Cited

U.S. PATENT DOCUMENTS

| | | | |
|---|---|---|---|
| 2,274,605 | 2/1942 | Hoffmeister | 16/116 A |
| 3,547,162 | 12/1970 | Schaerer | 273/81 R |
| 3,739,932 | 6/1973 | Westover | 16/116 R |
| 3,800,361 | 4/1974 | Stauffer | 16/116 R |
| 4,098,506 | 7/1978 | Gaiser | 273/81 R |
| 4,262,385 | 4/1981 | Norman | 16/114 R |
| 4,722,296 | 2/1988 | Bowskill et al. | 16/114 R |
| 4,754,858 | 7/1988 | Robinson | 16/114 R |

*Primary Examiner*—P. Austin Bradley
*Assistant Examiner*—Chuck Y. Mah
*Attorney, Agent, or Firm*—Parsons & Associates; Don J. Flickinger; Robert A. Parsons

[57] ABSTRACT

A flexible sheet is detachably securable about the handle of a tool, cooking utensil or other implement. Preferably fabricated of cellular elastomer, such as foamed rubber, the sheet thermally and electrically insulates the hand of the user.

12 Claims, 5 Drawing Sheets

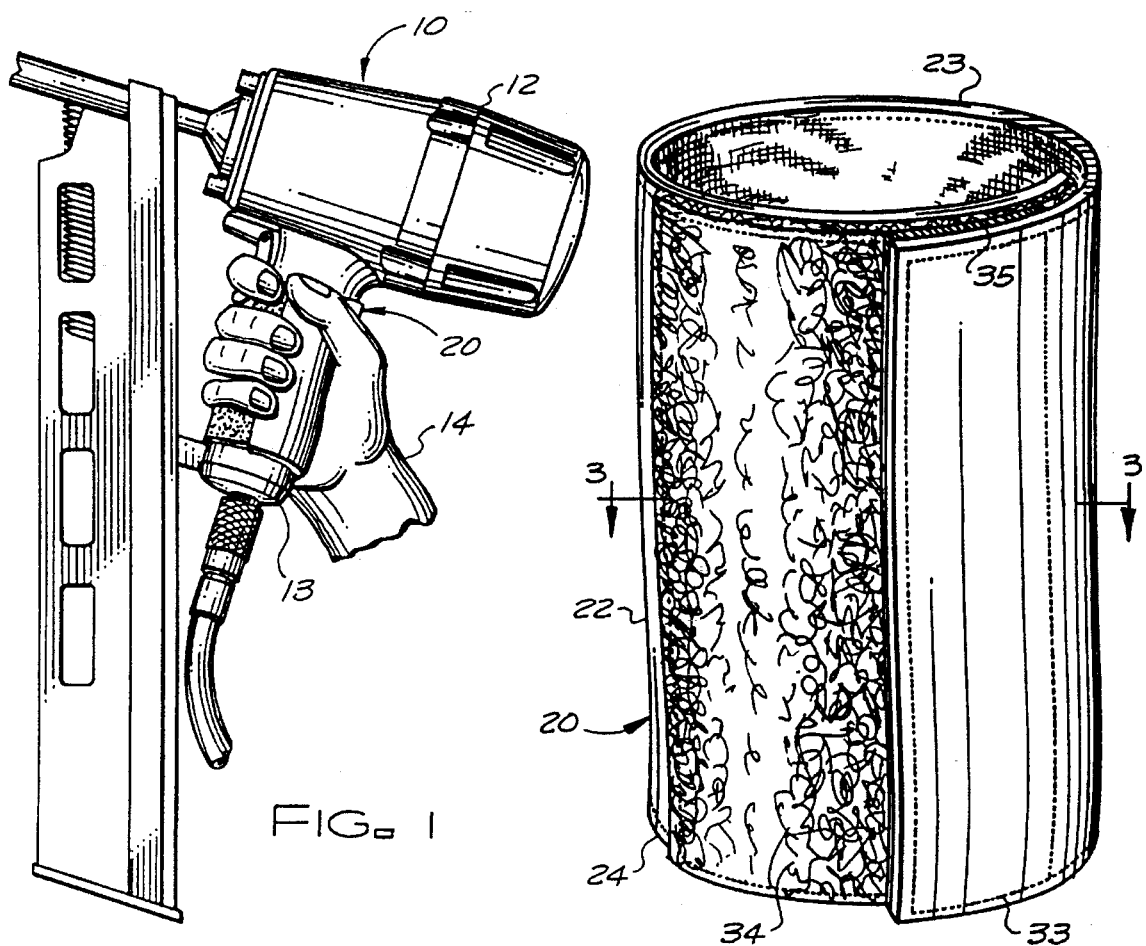
FIG. 1
FIG. 2
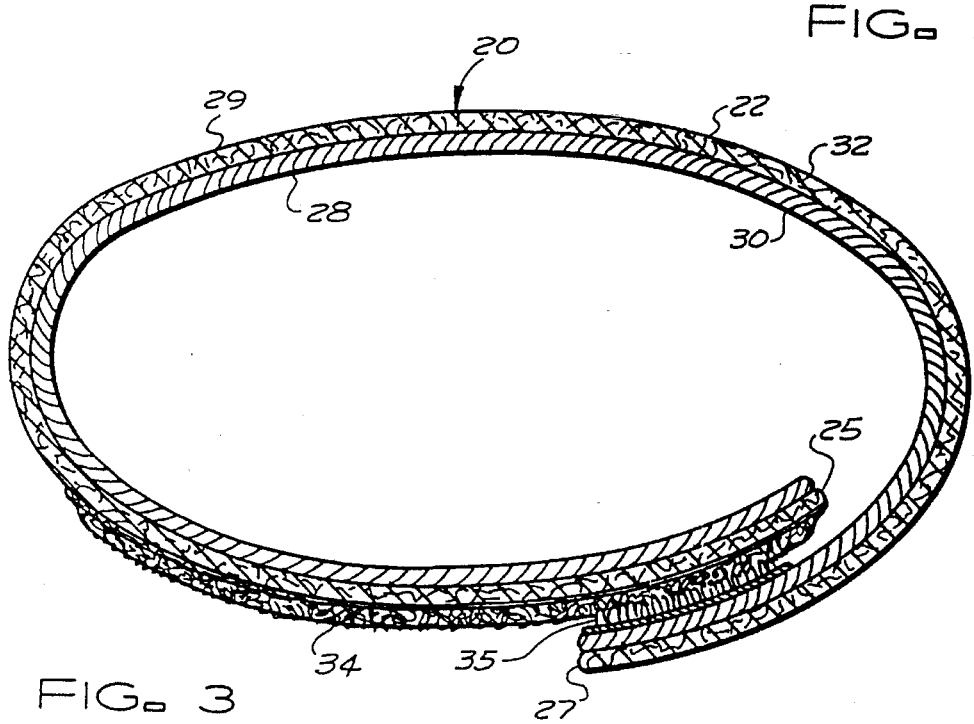
FIG. 3

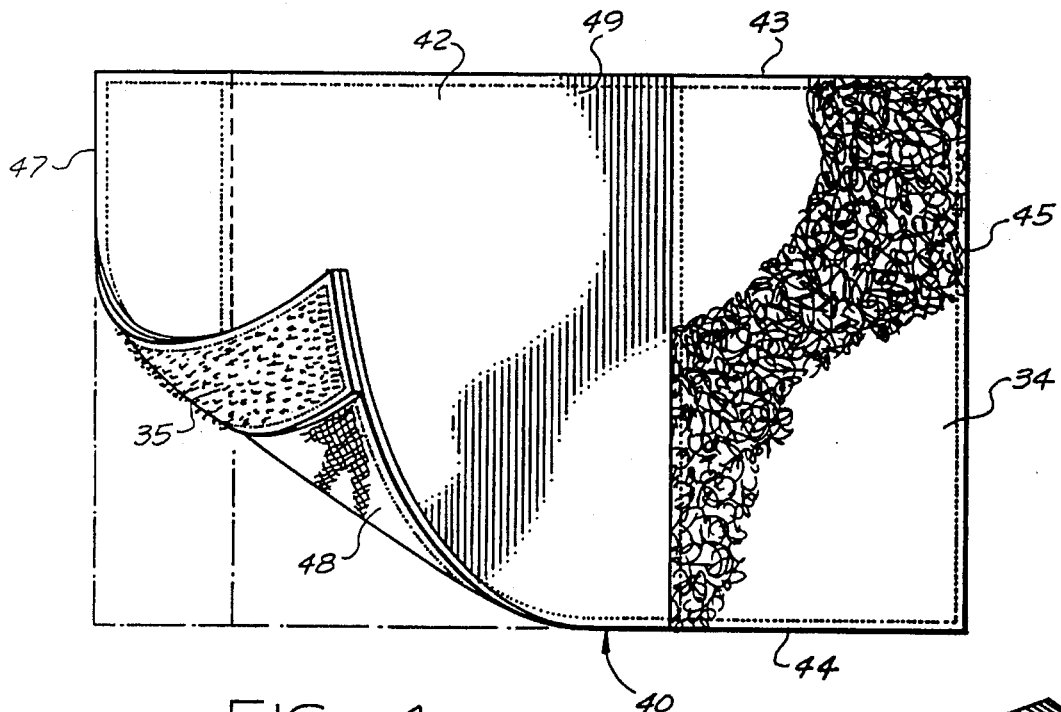
FIG. 4
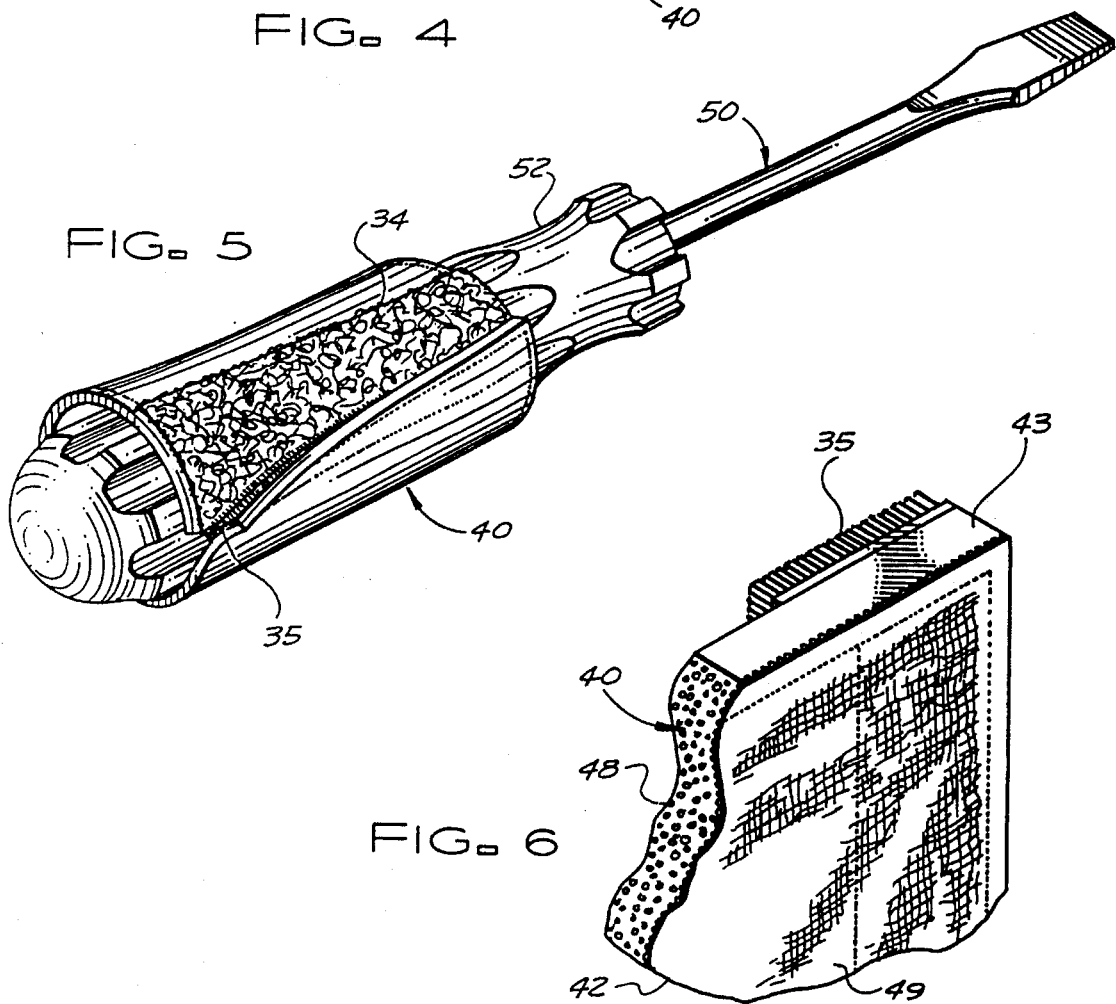
FIG. 5
FIG. 6

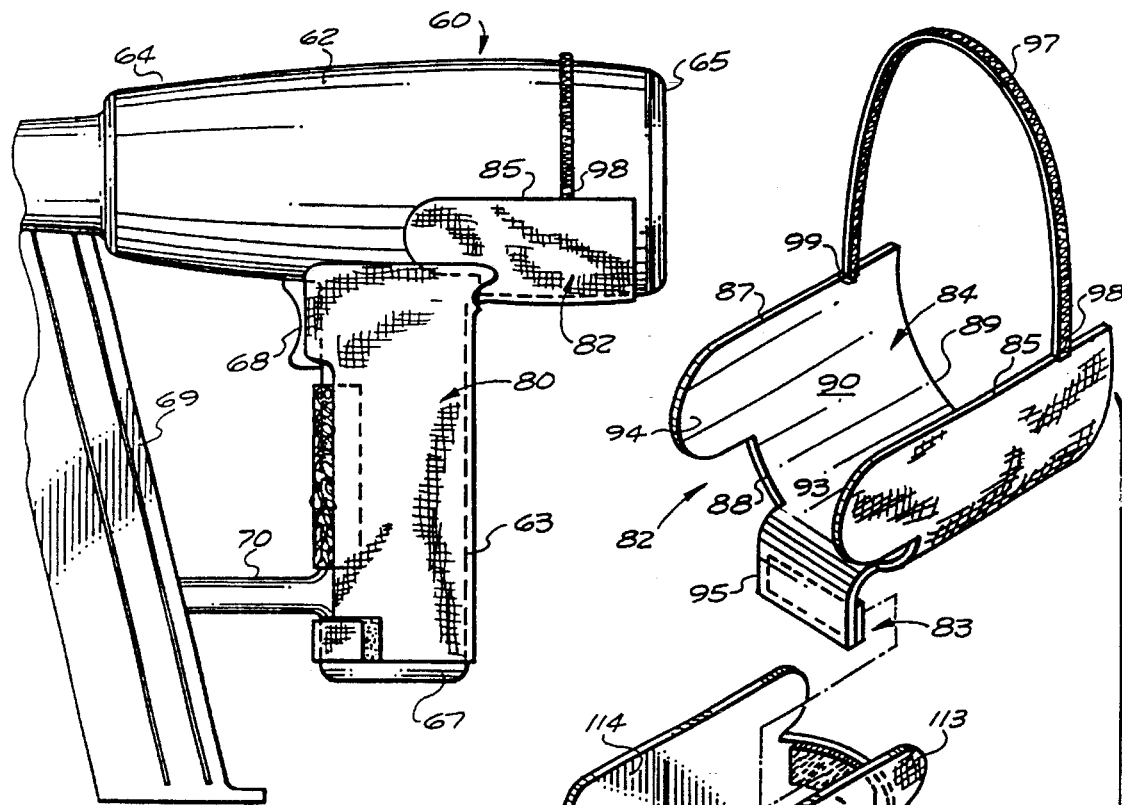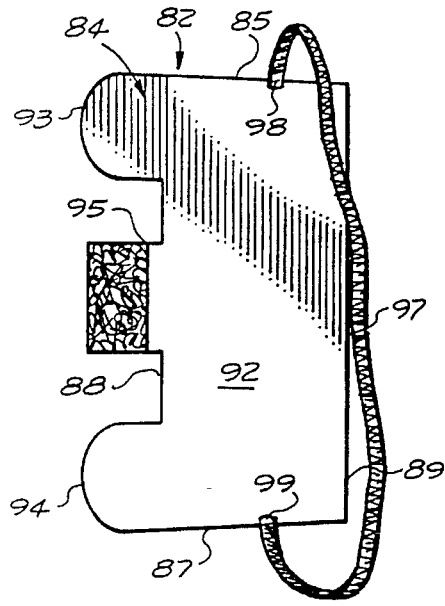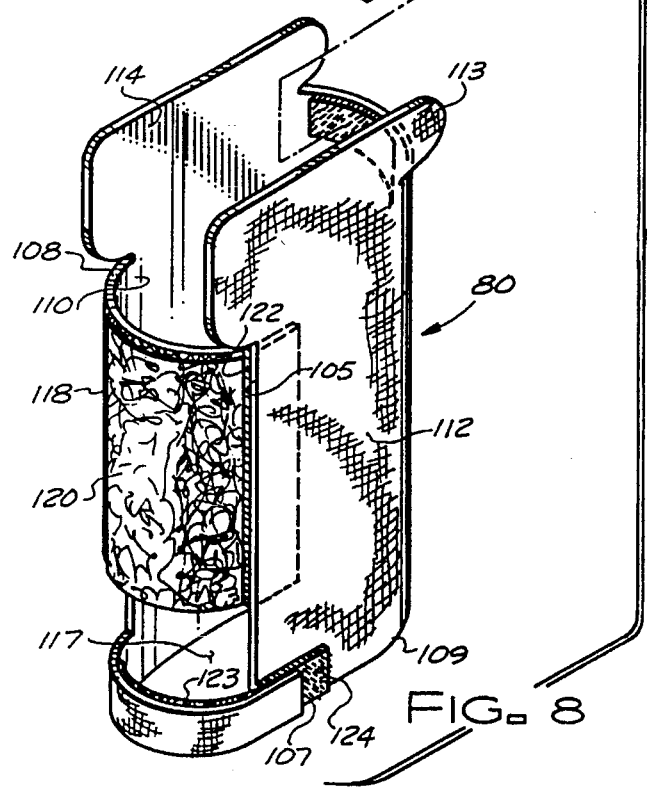
FIG. 7
FIG. 8
FIG. 9

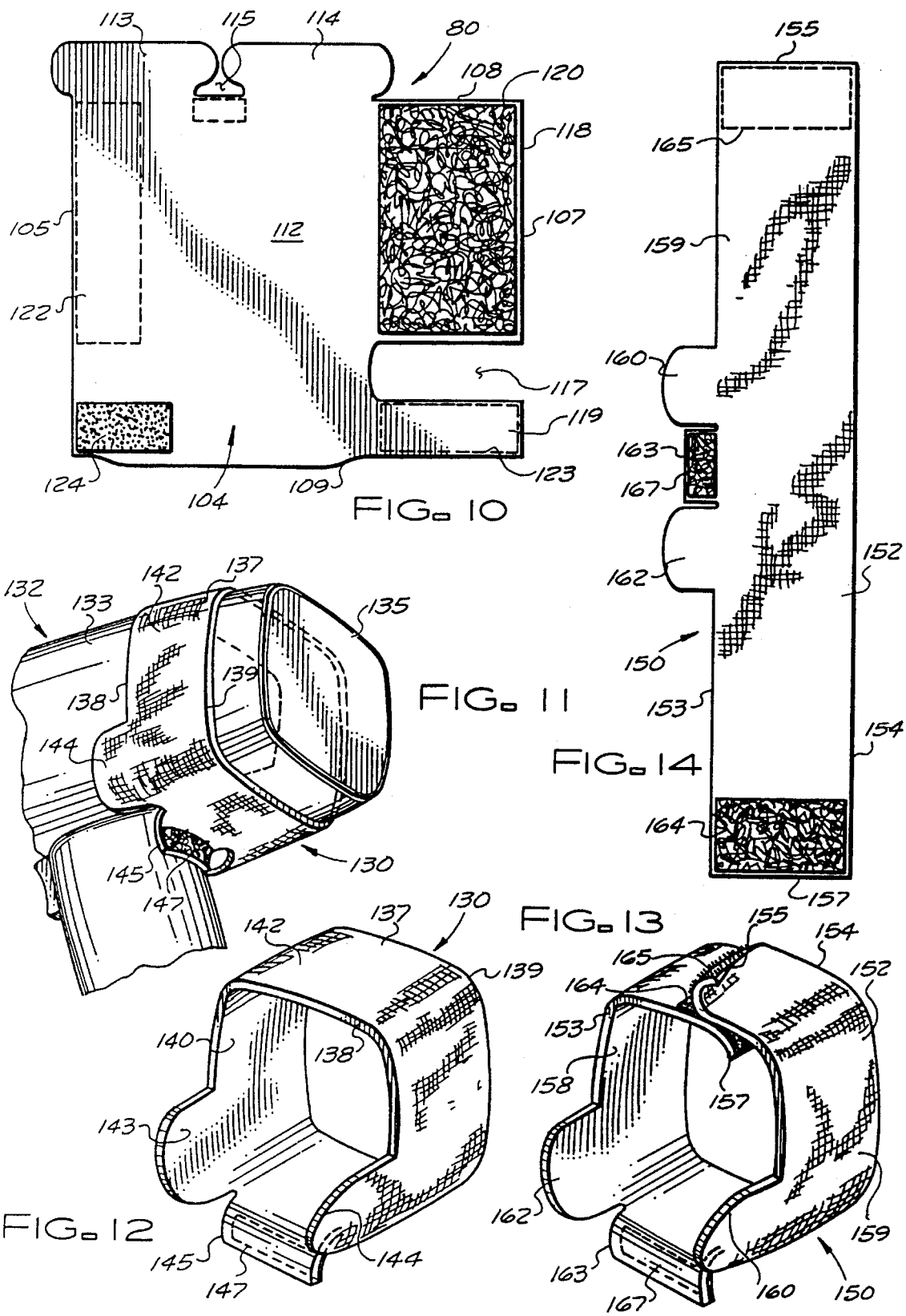

GRIP COVER

This application is a continuation of application Ser. No. 08/078,447, filed 16 Jun. 1993, now U.S. Pat. No. 5,347,684, which is a Continuation-In-Part of U.S. application Ser. No. 07/959,436, filed 13 Oct. 1992, now abandoned.

BACKGROUND OF THE INVENTION

1. Field of the Invention

This invention relates to protective covers.

More particularly, the present invention relates to protective covers of the type especially adapted for embracing the handle of an implement.

In a further and more specific aspect, the instant invention concerns a grip cover which is securable to the handle of an implement for protecting the hand of the user.

2. Prior Art

It is frequently necessary, in the normal daily course of affairs for many persons, to handle implements wherein there exists the potential for pain or harm such as generated by heat or electricity. Examples involving both skilled professionals plying their trade and enthusiasts pursuing avocational interests are manifest.

Representative is the construction worker, carpenter or roofer utilizing a power hand tool such as a nail gun or staple driver. The tool, usually having a metal exterior including handle, is used in an intermittent cycle. While construction materials are being cut, fitted and placed, the tool lies dormant absorbing solar energy. Subsequently, the tool is picked-up with attendant discomfort, or even pain and damage, to the hand of the worker.

Accordingly, it is common practice for the worker to maintain a piece of cloth which is wrapped around the handle prior to grasping the tool. The cloth, which must be kept within convenient reach, is frequently worn as a bandana. This practice, however, has serious limitations. Most apparent is simply the necessity of keeping the cloth readily available. If the cloth is not wrapped properly, the worker's hand is still exposed to the heated handle of the tool. The cloth can impair proper gripping of the tool and dangling ends present a safety hazard. Indeed the practice is tedious, laborious and time consuming.

In tools having a general pistol type grip, such as found in drills, nail guns and the like, simply wrapping the grip can be exceedingly unsatisfactory. During use, the weight of the tool may cause it to slip in the operators grip, such that the housing above the handle contacts the top of the hand. Besides being heated by solar radiation, this is the portion of a tool most likely to become heated by its operation. Wrapping a cloth about the handle may partially protect the palm of the operators hand, but it will not protect the top part of the hand when it contacts the housing of the tool.

Numerous analogous examples are readily apparent. Exemplary is the technician, professional or amateur, utilizing an implement, such as a screw driver, in an environment having the potential for producing electrical shock. A similar situation involves the handling of cooking vessels whether in a kitchen or outdoors. Further similarity is observable in the use of lawn and garden tools.

Various purported solutions have been improvised and advanced. However, none have proven to be entirely adequate. The use of rags or cloths is lacking for reasons previously set forth. Hot pads and the like are considered to be analogous. Similar devices which are semi-permanently attached, such as by the use of laces, are time consuming to replace and not readily transferable from implement to implement. A primary alternative, gloves, reduce tactile sensitivity and can be uncomfortable.

It would be highly advantageous, therefore, to remedy the foregoing and other deficiencies inherent in the prior art.

Accordingly, it is an object of the invention to provide improvements in the handling of implements.

Another object of the invention is the provision of an improved grip or handle cover.

And another object of this invention is to provide a grip cover especially adapted for use where there exists the potential for discomfort or pain being inflicted upon the user of an implement.

Still another objective of the invention is the provision of a grip cover which is easily detachably securable to alternately selected implements.

Yet still another object of the instant invention is to provide a grip cover which frictionally engages the handle to which it is attached.

Yet still another object of the invention is the provision of a grip cover which is particularly convenient to attach and remove.

And a further object of the invention is to provide a grip cover which will thermally and electrically insulate the hand of the user from the handle of an implement.

Still a further object of the immediate invention is the provision of a grip cover which is readily adjustable to accommodate handles of varying girth.

And still a further object of the invention is to provide a grip cover that is especially comforting to the hand and easy to use.

And yet a further object of the invention is the provision of a grip cover according to the foregoing which is inexpensively fabricated of conventional material.

SUMMARY OF THE INVENTION

Briefly, to achieve the desired objects of the instant invention in accordance with a preferred embodiment thereof, first provided is a sheet of flexible material having an inner surface receivable against the handle of an implement and an outer surface for receiving the hand of a user thereagainst. Next provided are securement means for affixing the sheet about the handle.

Preferably, the inner surface of the sheet is friction enhanced to retard movement relative the handle. Additionally, the sheet may be thermally and/or electrically insulative. Further, for the comfort of the hand of the user, the sheet may be resilient.

A preferred securement means is in the form of an engagement pair having an element carried on the inner surface proximate a first marginal edge of the sheet and a complemental element carried on the outer surface proximate a second marginal edge of the sheet. In accordance with a further embodiment thereof, the securement means detachably affixes the sheet to the handle with selective predetermined compressive force. The elements of a presently preferred engagement pair are engagable at selective locations spaced from at least one of the marginal edges as can be accomplished by VELCRO®.

In accordance with a further embodiment of the invention, the sheet includes a first ply carrying the inner surface and a second ply carrying the outer surface. It is preferred that the first ply be fabricated of a friction enhancing material and the second ply fabricated of synthetic fabric. The friction enhancing material may be in the form of a cellular elastomer.

In accordance with another embodiment of the invention, the sheet of the grip cover includes extensions which extend upward to overlap the housing of an implement.

In accordance with yet another embodiment of the invention, the grip cover includes an auxiliary guard receivable about the housing of an implement. The auxiliary guard is removably coupled to the grip cover by auxiliary attachment means.

BRIEF DESCRIPTION OF THE DRAWINGS

The foregoing and further and more specific objects and advantages of the instant invention will become readily apparent to those skilled in the art from the following detailed description of tile preferred embodiment thereof taken in conjunction with the drawings in which:

FIG. 1 is a perspective view of an implement, herein shown as a nail gun, as it would appear in use when fitted with a grip cover embodying the principles of the instant invention;

FIG. 2 is a perspective view of the grip cover of FIG. 1;

FIG. 3 is a horizontal sectional view taken along the line 3—3 of FIG. 1;

FIG. 4 is a plan view of an alternate grip cover constructed in accordance with the teachings of the instant invention, a corner thereof being upturned to reveal the opposite side;

FIG. 5 is a perspective view of an alternate implement, a conventional screwdriver, having the grip cover of FIG. 4 affixed thereto;

FIG. 6 is an enlarged fragmentary perspective view of the grip cover of FIG. 4.

FIG. 7 is a perspective view of an implement, herein shown as a nail gun, as it would appear when fitted with a further embodiment of a grip cover and auxiliary guard embodying the principles of the instant invention;

FIG. 8 is a perspective view of the grip cover and auxiliary guard of FIG. 7;

FIG. 9 is a plan view of the auxiliary guard of FIGS. 7 and 8;

FIG. 10 is a plan view of the grip cover of FIGS. 7 and 8;

FIG. 11 is a perspective view of an alternate auxiliary guard as it would appear fitted on an implement, herein shown as a nail gun, embodying the principles of the instant invention;

FIG. 12 is a perspective view of the alternate auxiliary guard of FIG. 11;

FIG. 13 is a perspective view of a further embodiment of an auxiliary guard;

FIG. 14 is a plan view of the auxiliary guard of FIG. 13;

DETAILED DESCRIPTION OF THE PREFERRED EMBODIMENT

Figure 15:
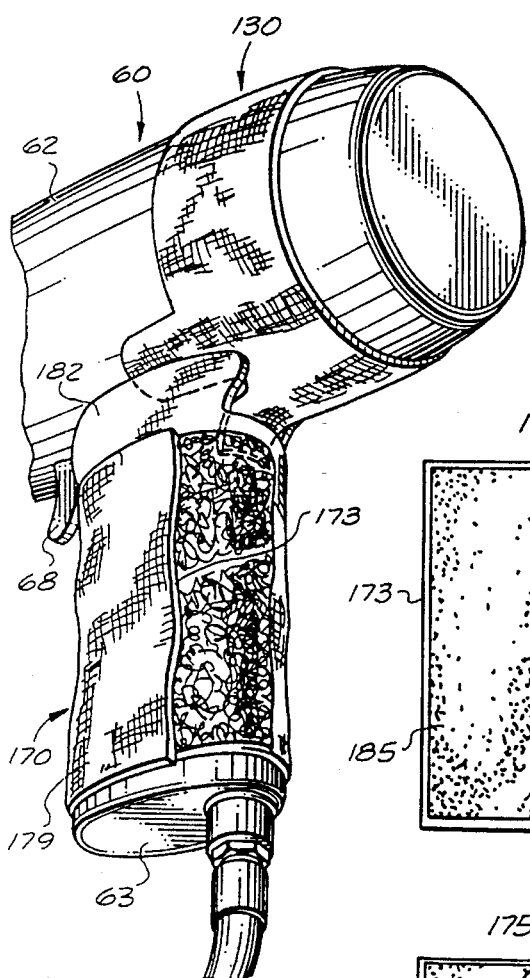
FIG. 15 is a perspective view of an implement, herein shown as a nail gun, as it would appear when fitted with the auxiliary guard of FIGS. 11 and 12, and a further embodiment of a grip cover embodying the principles of the instant invention.

Turning now to the drawings in which like reference characters indicate corresponding elements throughout the several views. Attention is first directed to FIG. 1 which illustrates a nail gun generally designated by the reference character 10. A common implement frequently used by carpenters and other construction workers, nail gun 10 typically includes a metallic housing 12 having projecting handle 13 which is grasped by hand 14 of the user.

Herein chosen for purposes of reference and orientation in connection with the ensuing detailed description of the instant invention, nail gun 10 is intended to be typically representative of various implements having handles with the potential to inflict pain or damage the hand of the user. Exemplary are implements subject to heat or electricity either accidentally or deliberately. Numerous examples will readily occur to those skilled in various arts.

As seen in FIG. 1, a grip cover, generally designated by the reference character 20 and embodying the principles of the present invention, is secured about handle 13 for protecting and comforting hand of 14. Grip cover 20, viewed in greater detail in FIGS. 2 and 3, includes flexible sheet 22 having first lateral edge 23, second lateral edge 24 and first and second longitudinal edges 25 and 27, respectively, with the orientation being relative handle 13. Flexible sheet 22 further includes inner surface 28 which is received against handle 13 and outer surface 29 which receives hand 14.

In accordance with the immediately preferred embodiment of the invention, flexible sheet 22 is fabricated of an inner ply 30 carrying inner surface 28 and an outer ply 32 carrying outer surface 29. While the plies may be joined by various means, such as adhesive bonding, it is preferred that the plies be sewn as represented by the stitching line 33. A preferred means for affixing sheet 22 about handle 13 is the hook and loop securement means commercially available under the mark VELCRO®. A swatch 34 of the loop or female element of the VELCRO® material is secured to sheet 22 to extend along a terminal marginal portion of the outer surface 29 extending from first longitudinal edge 25. Similarly, a strip 35 of the hook or male element of the VELCRO® material is secured to inner surface 28 to extend along a terminal portion thereof adjacent second longitudinal edge 27.

Surface 28 is friction enhanced to prevent slipping upon handle 13. For this purpose, it is preferred that inner ply 30 be fabricated of a foamed or cellular elastomer which is also thermal and electrically insulative and provides a cushioning effect for hand 14. Outer surface 32 is fabricated of a synthetic fabric, such as nylon, which is known to be durable and easily cleanable. Strip 35 is securable at selective locations along swatch 35 to compressively and constrictively embrace handles of various girth. Further, the loop or female element of VELCRO® is substantially softer than the hook or male element. Therefore, it is preferred that the component of the VELCRO® secured to outer surface 29 which will contact the hand of the user be the loop or female element.

Referring now to FIG. 4, there is seen an alternate embodiment of the instant invention, generally designated by the reference character 40 including sheet 42 having first and second lateral edges 43 and 44, respectively, and first and second longitudinal edges 45 and 47, respectively, relative the handle to which it will be fitted. In general similarity to the previously described embodiment, the immediate embodiment includes inner surface 48 carrying strip 35 approximate edge 47 and outer surface 49 carrying swatch 34 approximate edge 45. Grip cover 40, being generally analogous to previously described grip cover 20, is secured to the handle of a selected implement in a manner as previously described. For purposes of illustration, there is seen, in FIG. 5, a screw driver generally designated by referenced character 50 having handle 52 to which is secured to grip cover 40.

Sheet 42, as seen in greater detail in FIG. 6, includes an outer fabric surface 49 and an inner friction enhancing surface 48. Fabrication of such structures are well known to those, skilled in the art. Exemplary is a ply of cloth and a ply of elastomer bonded together generally as previously described. A product meeting this specification is commercially available from The Green Pepper, Inc. Eugene, Oreg. and designated Order Number F17. Also contemplated are sheet goods, such as nylon or vinyl, which are rubberized on one side.

Turning now to FIG. 7, a nail gun generally designated by the reference character 60 is illustrated. Disregarding manufacturers design considerations, nail gun 60 is generally identical to and has the same components as nail gun 10 illustrated in FIG. 1, including a metallic housing 62, and a projecting handle 63 which is grasped by the operator. For further reference and orientation in connection with the ensuing detailed description of an alternate embodiment of a grip cover, nail gun 60 further includes housing 62 having a forward end 64 and a rearward end 65. Handle 63 terminates in a butt 67, and includes a trigger 68 proximate housing 62 for operating nail gun 60. A nail feeding mechanism 69 extends from forward end 64 of housing 62 and is further supported by a brace 70 extending from handle 63 proximate butt 67. (Prior described nail gun 10 includes the same elements, but they are not specifically identified.)

Still referring to FIG. 7, a grip cover, generally designated by the reference character 80 and embodying the principles of the present invention, is secured about handle 63, conforming to its shape and accommodating brace 70 and trigger 68. Supplementary to grip cover 80 is an auxiliary guard, generally designated 82, which is received about rearward end 64 of housing 62. Auxiliary guard 82 is attachable to grip cover 80 in order to maintain its proper orientation and position about housing 62. Grip cover 80 covers handle 63, protecting the palm of an operators hand, while auxiliary guard 82 protects the top of the operators hand from the portion of housing 62 proximate rearward end 65.

It will be understood that while both grip cover 80 and auxiliary guard 82 are shown in FIG. 8 being used together, grip cover 80 may be used alone. As can be seen in FIG. 8, Auxiliary guard 82 is removably attachable to grip cover 80 by auxiliary attachment means, described in greater detail below, allowing for individual use of either component. Each is attachable to nail gun 60 independent of the other. However, for the most complete protection of the users hand, fitting both grip cover 80 and auxiliary guard 82 to nail gun 60 is suggested.

With additional reference to FIG. 9, auxiliary guard 82 includes a sheet 84 having first longitudinal edge 85, second longitudinal edge 87 and first and second lateral edges 88 and 89, respectively, with the orientation being in relation to housing 62. Sheet 84 further includes inner surface 90 which is received against housing 62 and outer surface 92. A first lateral projection 93 extends from lateral edge 88 proximate longitudinal edge 85, a second lateral projection 94 extends from lateral edge 88 proximate longitudinal edge 87, and a tab 95 extends from lateral edge 88 intermediate first lateral projection 93 and second lateral projection 94. Sheet 84 is received against the lower portion of housing 62 proximate rearward end 65, with longitudinal edges 85 and 87 extending longitudinally along the sides of housing 62. Securement means constrictively affixes sheet 84 to housing 62. In this embodiment, securement means is an elastic member 97 extending between longitudinal edges 85 and 87, having a first end 98 coupled to longitudinal edge 85 and a second end 99 coupled to longitudinal edge 87. Elastic member 97 is configured to be constrictively received about rearward end 65 of housing 62, holding sheet 84 in position against housing 62.

Turning now to FIG. 10, grip cover 80 includes a sheet 104 having first longitudinal edge 105, second longitudinal edge 107 and first and second lateral edges 108 and 109, respectively, with the orientation being in relation to handle 63. Sheet 104 further includes inner surface 110 which is received against handle 63 and outer surface 112. A first extension 113 and a second extension 114 extend from first lateral edge 108, separated by a notch 115. A slot 117 extends inward from second longitudinal edge 107 proximate second lateral edge 109, separating second longitudinal edge 107 into a first flap 118 adjacent first lateral edge 108 and a second flap 119 adjacent second lateral edge 109. Sheet 104 is received about handle 63 with first lateral edge 108 encircling handle 63 beneath trigger 68 and second lateral edge 109 encircling handle 63 adjacent butt 67. First extension 113 and second extension 114 extend from first lateral edge 108 upward on both sides of trigger 68, overlapping the lower portion of housing 62, with notch 115 positioned adjacent housing 62 opposite trigger 68.

A preferred means for affixing grip cover 80 about handle 63 is the hook and loop securement means commercially available under the mark VELCRO®. A swatch 120 of the loop or female element of the VELCRO® material is secured to outer surface 112 of sheet 104 at first flap 118, preferably extending from first lateral edge 108 to slot 117. Similarly, a strip 122, shown by broken lines in FIG. 10, of the hook or male element of the VELCRO® material is secured to inner surface 110 of sheet 104 to extend along first longitudinal edge 105 adjacent first lateral edge 108. Another swatch 123, shown by broken lines in FIG. 10, of the loop or female element of the VELCRO® material is secured to inner surface 110 of sheet 104 at second flap 119. Similarly, a strip 124 of the hook or male element of the VELCRO® material is secured to outer surface 112 of sheet 104 to extend along second lateral edge 109 adjacent first longitudinal edge 105. The separation of second longitudinal edge 107 into flaps 118 and 119 by slot 117, accommodates brace 70, with flap 118 above and flap 119 below.

In accordance with the immediately preferred embodiment of the invention, flexible sheet 104 of grip cover 80 and sheet 84 of auxiliary guard 82 are preferably constructed of sheet goods, such as nylon or vinyl, which are rubberized on one side. A product meeting this specification is commercially available from Rubatex Corporation, Bedford Virginia, called Rubatex. Rubatex is constructed of neoprene and hypalon, a nylon material. Those skilled in the art will understand that sheet 104 and sheet 84 may also be constructed with material as previously described.

It is desirable that inner surfaces 90 and 110 are friction enhanced to prevent slipping upon housing 62 and handle 63 respectively. For this purpose, it is preferred that the inner surfaces be fabricated of rubber, which has a high coefficient of friction on metal, and which is also thermal and electrically insulative and provides a cushioning effect for the operators hand. Outer surfaces 92 and 112 are preferably fabricated of a synthetic fabric, such as nylon, which is known to be durable and easily cleanable. Strips 122 and 124 are securable at selective locations along swatches 120 and 123 respectively, to compressively and constrictively embrace handles of various girth. Further, the loop or female element of VELCRO® is substantially softer than the hook or male element. Therefore, it is preferred that the component of the VELCRO® secured to outer surface 112, which will contact the hand of the user, be the loop or female element.

Auxiliary attachment means for attaching auxiliary guard 82 to grip cover 80 consists of tab 95 removably attachable to sheet 104 at notch 115. A preferred means for affixing tab 95 to sheet 104 is the hook and loop securement means described above. A swatch 125 of the loop or female element of the VELCRO® material is secured to outer surface 92 of sheet 84 at tab 95. Similarly, a strip 127 of the hook or male element of the VELCRO® material is secured to inner surface 110 of sheet 104 immediately adjacent notch 115.

A further embodiment of an auxiliary guard, generally designated 130, can be seen with reference to FIGS. 11 and 12. For this specific embodiment, a nail gun 132, substantially similar to nail gun 60, having a housing 133 and a projecting handle 134 is illustrated. Housing 133 has a rearward end 135 which has a substantially square cross section as opposed to a circular cross section in nail gun 60. Rearward end 135 of nail gun 132 is shown with a square cross section to illustrate that auxiliary attachment 130 can be used on a widely diversified group of implements and shapes due to the flexible and elastic properties of the material used. It will be understood that auxiliary attachments which have been previously described and which will be subsequently described will also conform to a wide variety of shapes.

Auxiliary guard 130 is substantially similar to auxiliary guard 82, having a sheet 137 with a first lateral edge 138, second lateral edge 139, with the orientation being in relation to housing 133. However, in this embodiment sheet 137 does not terminate in longitudinal edges coupled by an elastic member, instead sheet 137 is continuous, forming a flexible ring. Sheet 137 further includes inner surface 140 which is received against housing 133 and outer surface 142. A first lateral projection 143 extends from lateral edge 138, a second lateral projection 144 extends from lateral edge 138, and a tab 145 extends from lateral edge 138 intermediate first lateral projection 143 and second lateral projection 144. Sheet 137 is received about and constrictively engages rearward end 135 of housing 133, with first lateral projection 143 and second lateral projection 144 extending longitudinally along the sides of housing 133.

Auxiliary attachment means for attaching auxiliary guard 130 to grip cover 80 is substantially identical to the previously described means and consists of tab 145 removably attachable to sheet 104 at notch 115. A preferred means for affixing tab 145 to sheet 104 is the hook and loop securement means described above. A swatch 147 of the loop or female element of the VELCRO® material is secured to outer surface 142 of sheet 137 at tab 145, which is attachable to strip 127 secured to inner surface 110 of sheet 104.

Yet a further embodiment of an auxiliary guard, generally designated 150, can be seen with reference to FIGS. 13 and 14. Auxiliary guard 150 includes flexible sheet 152 having first lateral edge 153, second lateral edge 154 and first and second longitudinal edges 155 and 157, respectively, with the orientation being relative housing 133 when fitted on nail gun 132. Flexible sheet 152 further includes inner surface 158 which is received against housing 133 and outer surface 159. Auxiliary guard 150 is substantially similar to auxiliary guard 130 however, in this embodiment, sheet 152 does not form a continuous flexible ring. Instead, first longitudinal edge 155 and second longitudinal edge 157 of sheet 152 are releasably engageable by securement means. A first lateral projection 160 extends from lateral edge 153, a second lateral projection 162 extends from lateral edge 153, and a tab 163 extends from lateral edge 153 intermediate first lateral projection 160 and second lateral projection 162. Sheet 152 is constrictively received about rearward end 135 of housing 133, with first lateral projection 160 and second lateral projection 162 extending longitudinally along the sides of housing 133.

A preferred means for affixing first longitudinal edge 155 to second longitudinal edge 157 is the hook and loop securement means described above. A swatch 164 of the loop or female element of the VELCRO® material is secured to outer surface 159 of sheet 152 adjacent second longitudinal edge 157. Similarly, a strip 165 of the hook or male element of the VELCRO® material is secured to inner surface 158 of sheet 152 adjacent first longitudinal edge 155. Strip 165 is securable at selective locations along swatch 164 to compressively and constrictively embrace housings of various girth and shape.

Auxiliary attachment means for attaching auxiliary guard 150 to grip cover 80 is substantially identical to the previously described means and consists of tab 163 removably attachable to sheet 104 at notch 115. A preferred means for affixing tab 163 to sheet 104 is the hook and loop securement means described above. A swatch 167 of the loop or female element of the VELCRO® material is secured to outer surface 159 of sheet 152 at tab 163, which is attachable to strip 127 secured to inner surface 110 of sheet 104.

Turning now to FIG. 15 a further embodiment of a grip cover, generally designated by the reference character 170 and embodying the principles of the present invention, is secured about handle 63 of nail gun 60, conforming to its shape and accommodating brace 70 (not shown) and trigger 68. Supplementary to grip cover 170 is auxiliary guard 130 previously described in detail. Auxiliary guard 130 is attachable to grip cover 170 in order to maintain its proper orientation and position about housing 62. It will be understood by those skilled in the art that any of the previously described auxiliary guards may be used in combination with grip cover 170.

Figure 16:
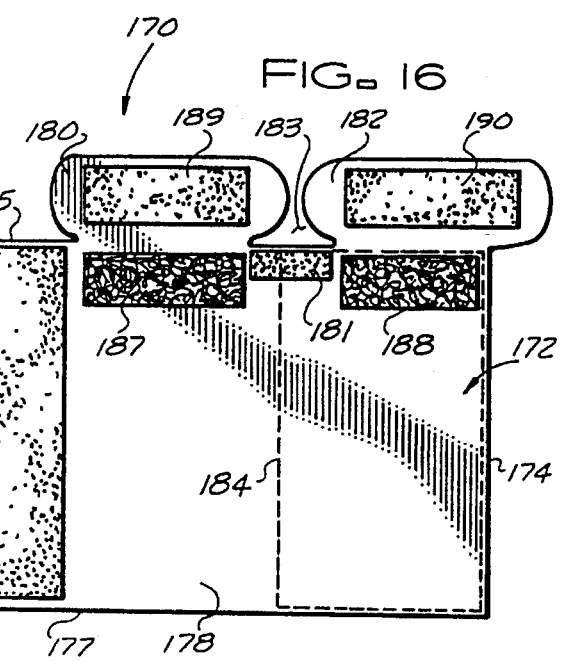
FIG. 16 is a plan view of the grip cover of FIG. 15.

Turning now to FIG. 16, grip cover 170 includes a sheet 172 having first longitudinal edge 173, second longitudinal edge 174 and first and second lateral edges 175 and 177, respectively, with the orientation being in relation to handle 63. Sheet 172 further includes inner surface 178 which is received against handle 63 and outer surface 179. A first extension 180 and a second extension 182 extend from first lateral edge 175, separated by a notch 183. As described previously, the auxiliary attachment means includes the tab of any of the above described auxiliary guards, having a swatch of the loop or female element attachable to sheet 172 adjacent notch 183. A strip 181 of the hook or male element of the VELCRO® material is secured to inner surface 178 of sheet 172 immediately adjacent notch 183.

Sheet 172 is received about handle 63 with first lateral edge 175 encircling handle 63 beneath trigger 68 and second lateral edge 177 encircling handle 63 above brace (not shown). First extension 180 and second extension 182 extend from first lateral edge 175 upward on both sides of trigger 68, overlapping the lower portion of housing 62, with notch 183 positioned adjacent housing 62 opposite trigger 68. A preferred means for affixing grip cover 170 about handle 63 is the hook and loop securement means described previously. A swatch 184, shown by broken lines in FIG. 16, of the loop or female element of the VELCRO® material is secured to outer surface 179 of sheet 172 adjacent second longitudinal edge 174. Similarly, a strip 185 of the hook or male element of the VELCRO® material is secured to inner surface 178 of sheet 172 adjacent first longitudinal edge 173.

Figure 17:
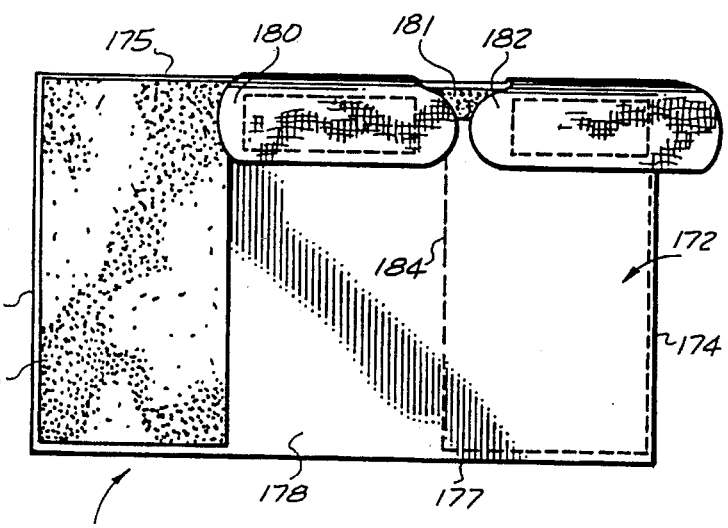
FIG. 17 is a plan view of the grip cover of FIG. 15, as it would appear with side tabs folded over and coupled to the main sheet.

With additional reference to FIG. 17, Grip cover 170 can be converted for use on a handle without an adjacent housing. Extensions 180 and 182 are configured to be inwardly foldable along first lateral edge 175 and secured to inner surface 178 of sheet 172. Again, the preferred securement means is the hook and loop securement means described previously. A first and second swatch 187 and 188 of the loop or female element of the VELCRO® material is secured to inner surface 178 of sheet 172 proximate first lateral edge 175 immediately adjacent first and second extensions 180 and 182 respectively. Similarly, a first and second strip 189 and 190 of the hook or male element of the VELCRO® material is secured to inner surface 178 of first and second extensions 180 and 182 respectively.

Figure 18:
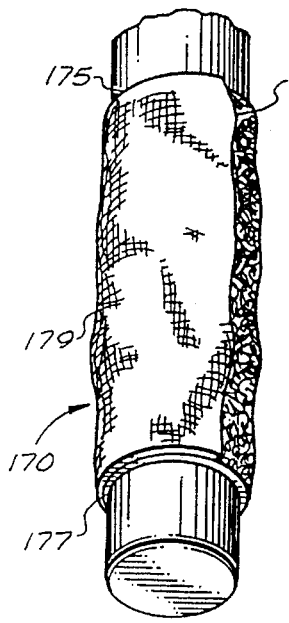
FIG. 18 is a perspective view the grip cover of FIG. 17, as it would appear fitted to a generally cylindrical handle of an implement.

As can be seen with reference to FIG. 18, grip cover 170 may be employed without an auxiliary guard, and with extensions 180 and 182 folded inward and coupled to inner surface 178. In this configuration, grip cover 170 is suitable for covering implements such as screw drivers, shovel handles or other implements lacking a housing which can contact the operators hand. Specifically illustrated in FIG. 18 is grip cover 170 fitted to handle 192 of a shovel.

Various changes and modifications to the embodiment herein chosen for purposes of illustration will readily occur to those skilled in the art. To the extent that such modifications and variations do not depart from the spirit of the invention, they are intended to be included within the scope thereof which is assessed only by a fair interpretation of the following claims.

Having fully described the invention in such clear and concise terms as to enable those skilled in the art to understand and practice the same, the invention claimed is:

1. A grip cover removably covering a handle, said handle extending from a housing of an implement and having a free end, for protecting the hand of a user, said grip cover comprising:
   a) a sheet of flexible material including
      i. an inner surface received against and frictionally engaging the handle of said implement, and
      ii. an outer surface for receiving the hand of said user thereagainst;
   b) securement means for constrictively affixing said sheet about said handle with a selective predetermined compressive force; and
   c) an extension, extending from an edge of said sheet so as to overlap said housing.

2. The grip cover of claim 1, wherein said sheet is thermally insulative.

3. The grip cover of claim 1, wherein said sheet is electrically insulative.

4. The grip cover of claim 1, wherein said securement means include:

a. an element of an engagement pair carried on said inner surface proximate a first marginal edge of said sheet; and
   a complemental element of said engagement carried on said outer surface proximate a second marginal edge of said sheet.
   said element being engagable with said complemental element at selective location spaced from one of said marginal edges.

5. The grip cover of claim 4, wherein said engagement pair is in the form of VELCRO®, said element being the male component thereof and said complemental element being the female component thereof.

6. The grip cover of claim 1, wherein said sheet includes:
   a. a first ply of friction enhancing material carrying said inner surface; and
   b. a second ply of a synthetic fabric carrying said outer surface.

7. A grip cover installable about a handle, said handle having an end, of an implement, said implement including a housing, said housing having a rearward end from which said handle extends, and for protecting the hand of the user, said grip cover comprising:
   a) a sheet of flexible material including
      i. an inner surface receivable against and frictionally engageable about the handle of said implement,
      ii. an outer surface for receiving the hand of said user thereagainst,
      iii. a first edge, and
      iv. a second edge spaced from said first edge;
   b) an extension, having an inner surface, extending from said first edge;
   c) a second extension extending from said first edge, spaced from first said extension, said first and second extensions being configured for overlapping engagement of said housing; and
   d) securement means for constrictively affixing said sheet about said handle with a selective predetermined compressive force.

8. A grip cover as claimed in claim 7 further including an auxiliary guard removably coupled to said grip cover by auxiliary attachment means and receivable about said housing.

9. A grip cover as claimed in claim 8 wherein said auxiliary guard includes:
   a. a sheet of flexible material including
      i. an inner surface receivable against said housing of said implement,
      ii. an outer surface,
      iii. a first edge; and
      iv. a second edge spaced from said first edge;
   b. securement means for constrictively affixing said sheet about said housing with a selective predetermined compressive force.

10. A grip cover as claimed in claim 9 wherein said auxiliary attachment means includes a tab having an inner surface, extending from said second end, secured to said sheet of said grip cover between said extensions by securement means.

11. A grip cover as claimed in claim 10 wherein said securement means of said auxiliary attachment means includes:
   a. an element of an engagement pair carried on said inner surface of said tab; and
   b. a complemental element of said engagement pair carried on said inner surface of said sheet adjacent said first edge intermediate first said extension and said second extension.

12. A grip cover as claimed in claim 11 wherein said sheet of said auxiliary guard further includes opposing ends extending between said first edge and said second edge, and said securement means of said auxiliary guard includes an elastic member extending between said opposing ends.

* * * * *